May 9, 1933.  C. R. SNYDER  1,908,455
BRAKE APPLYING MECHANISM FOR MOTOR VEHICLES
Filed May 25, 1931  2 Sheets-Sheet 1

Inventor
C.R. Snyder
By W. S. McDowell
Attorney

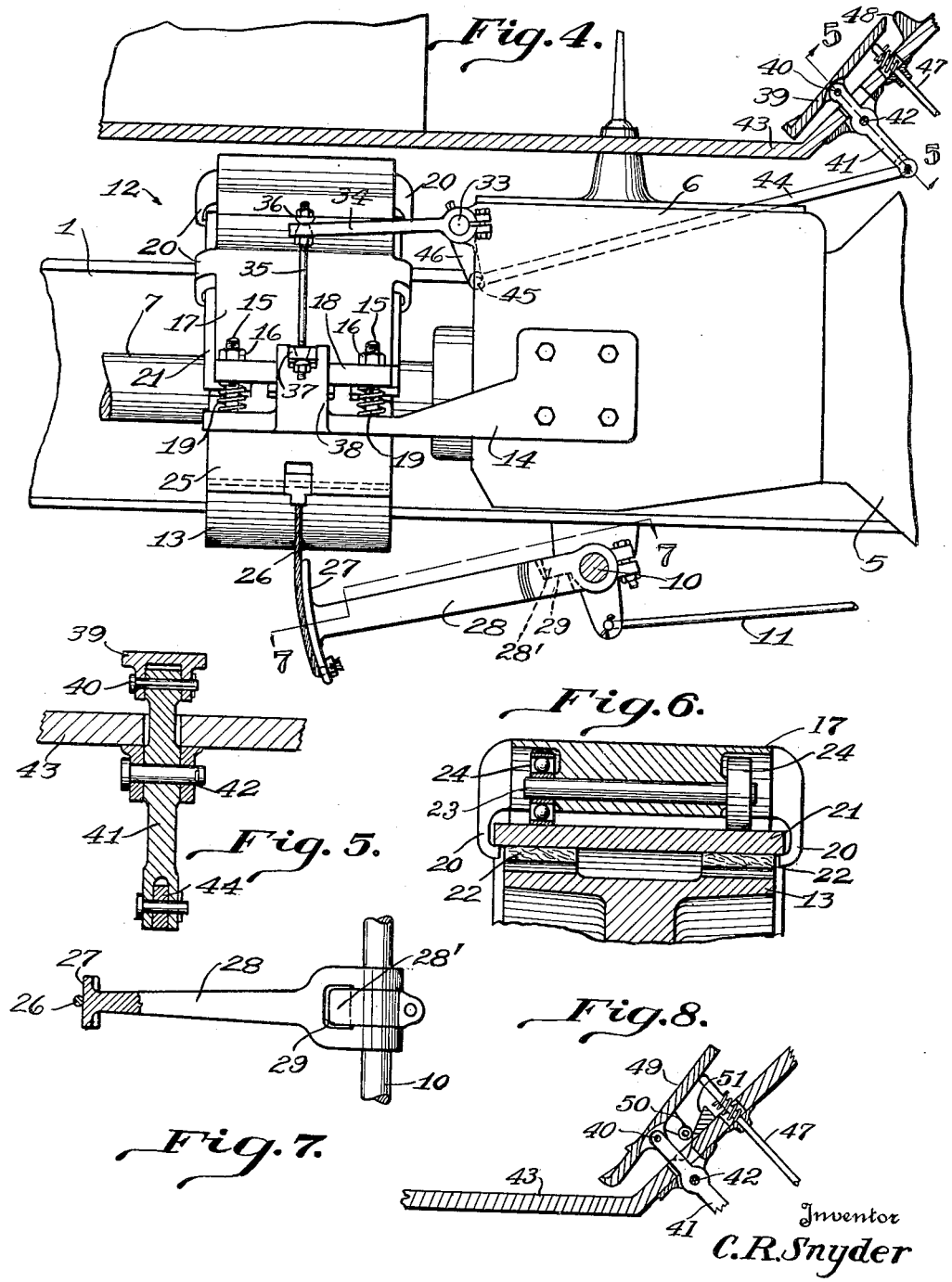

Patented May 9, 1933

1,908,455

UNITED STATES PATENT OFFICE

CHARLES R. SNYDER, OF MIAMI, FLORIDA

BRAKE APPLYING MECHANISM FOR MOTOR VEHICLES

Application filed May 25, 1931. Serial No. 539,783.

This invention relates to improvements in brake actuating mechanism for motor vehicles, and has for its primary object the provision of improved means whereby the movement of the vehicle, in connection with which the mechanism is mounted, is employed for the purpose of effecting the application of the vehicle brakes. Heretofore motor vehicle brake members have been to a very large degree actuated by the sheer physical strength of the operator, although I am aware of the fact that it has been proposed to operate brakes on motor vehicles by the employment of superatmospheric and subatmospheric pressures in fluid controlled systems, however, in the present invention I provide a mechanical brake applicator which may be operated by the slightest degree of pressure on the part of the vehicle operator and whereon in the force necessary to effect a quick and positive actuation of the vehicle brakes is supplied by the inertia of the moving vehicle itself, the slightest degree of movement on the part of the vehicle serving to provide for the quick and positive setting of the brakes.

It is another object of the invention to provide means for applying the motor vehicle brakes which is at all times under the control of the vehicle operator. Usually, in motor vehicle operation it is customary, in the braking of the vehicle, for the operator to transfer his right foot from the accelerator pedal to the ordinary brake pedal. This is a movement which while in most cases is accomplished instinctively and with considerable rapidity yet there is an appreciable interval of time involved in the transferring of the foot from the accelerator pedal to the brake pedal, and then depressing the brake pedal manually to apply the brakes. In accordance with the present invention there is associated with the accelerator pedal the manual control for governing the operation of the mechanical brake actuating means comprising the present invention, whereby the operator of the vehicle may, without appreciably changing the position of his right foot, control selectively either the operation of the accelerator or the operation of the brake applying means to the end of obtaining prompt and complete control of the movements of the vehicle and in a much faster and more convenient manner than can be done with customary vehicle controls.

My present invention is particularly useful in connection with motor vehicles which have recently appeared on the market using what is known as an "over-running" clutch in the speed transmission box, wherein the engine is disconnected from the propeller shaft when the accelerator pedal is raised. This type of transmission is popularly known as the "free-wheeling" type. While such a transmission has many advantages over the customary clutch control type, yet it involves considerable more usage of the vehicle brakes, for the reason that when the accelerator pedal is released the vehicle coasts until the brakes are applied and the accelerator pedal again depressed. In heavy traffic this means a constant shifting of the right foot from the accelerator pedal to the brake pedal. By the employment of the control mechanism comprising the present invention the accelerator and brake mechanisms may be operated without appreciably altering the position of the driver's foot with relation to the accelerator control, whereby instant stopping or deceleration of the vehicle may be secured or corresponding promptness obtained in affecting its acceleration.

In accordance with the present invention I provide a brake control unit which consists of a driving member rotatably carried by the propeller shaft of a motor vehicle and mounted to rotate in unison with said shaft and the driven wheels, and I provide a co-acting member which is engageable at will with the driving member by the use of an easily actuated foot control, whereby said co-acting member will be given a desired degree of rotary movement by frictional engagement with the driving member, the degree of movement of the co-acting member being sufficient to effect quickly and positively the application of the vehicle brakes with which it is connected.

It is another object of the invention to provide a brake control mechanism of the character specified which may be safely and reliably operated at all motor vehicle speeds, and wherein deceleration of the motor vehicle is accomplished with substantially a complete absence of "grab", jar or irregularity. Further, the mechanism is such as to provide for the operation of the brake applying means when the vehicle is moving at extremely low speeds in either a forward or rearward direction.

This application is a continuation in part of my prior application, Serial No. 503,532, filed Dec. 19, 1930.

With these and other objects in view, which will appear as the description proceeds, the invention consists in the novel features of construction, combinations of elements and arrangements of parts hereinafter to be more fully described and pointed out in the appended claims.

In the accompanying drawings:

Fig. 4 is a vertical longitudinal sectional view on an enlarged scale showing my improved brake applying means as mounted in connection with the propeller shaft, accelerator control and transmission structure of a motor vehicle;

Fig. 5 is a detail sectional view taken through the accelerator pedal on the line 5—5 of Fig. 4;

Fig. 6 is a detail transverse sectional view on the line 6—6 of Fig. 3;

Fig. 7 is a horizontal sectional view on the plane indicated by the line 7—7 of Fig. 4;

Fig. 8 is a detail view of a slightly modified form of accelerator control.

Figure 1:
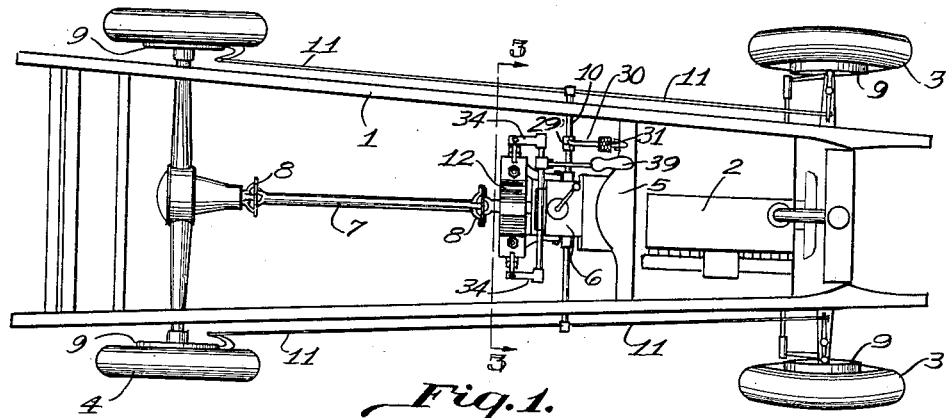
Fig. 1 is a top plan view of a motor vehicle chassis equipped with the brake operating mechanism comprising the present invention.
Figure 2:
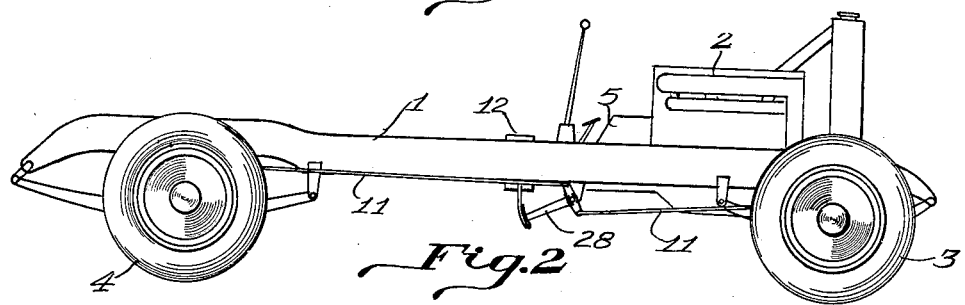
Fig. 2 is a side elevation thereof.

Referring more particularly to the drawings, the numeral 1 designates the frame of a motor vehicle. The engine of the vehicle is indicated at 2, the forward or steering wheels at 3, and the rear or driving wheels by the numeral 4. The clutch casing is designated by the numeral 5 and a standard transmission or gear box is indicated by the numeral 6. The driven or propeller shaft leading from the transmission is indicated by the numeral 7 and this shaft is provided with the usual universal joint 8.

The wheels 3 and 4 are equipped with the customary brake mechanism 9 which may be of any standard form and, as usual, this brake mechanism is operated by a rock shaft 10 journaled in connection with the frame 1. The outer ends of the rock shaft are equipped with cranks which are connected by means of cables or rods 11 with corresponding cranks constituting a part of the brake mechanisms 9. Inasmuch as the brake mechanism used in connection with said brake means may be of any standard design, it has not been deemed necessary to illustrate any particular form of such mechanism.

Mounted on the forward end of the propeller shaft 7 immediately to the rear of the transmission casing 6 is the brake applying unit 12 comprising the present invention. In the specific embodiment of this unit which has been selected for purposes of illustration and description, although it will be understood at this juncture that this unit is but merely one of many possible forms, the numeral 13 designates the driving member. The driving member consists of a wheel having a flanged periphery, the hub of the wheel being keyed or otherwise secured to the propeller shaft to positively rotate in unison therewith.

Carried by the transmission casing 6 is a pair of stationary brackets 14, which provide horizontally and rearwardly extending arms which are arranged on each side of the wheel 13. These bracket arms are employed to support upstanding studs 15 which have their upper ends threaded for the reception of nuts or equivalent stop devices 16. Guided by the studs 15 for limited movement in a vertical direction is an arcuate frame 17 which has its lower ends formed with laterally directed outturned lugs 18, and which lugs are formed with openings for the reception of the studs 15. Coil springs 19 surround the studs 15 and are interposed between the lugs 18 and the bearing arms 14, the normal tendency of said springs being to elevate the frame 17 until the upper surfaces of the lugs 18 thereof engage with the nuts or stop devices 16.

Figure 3:
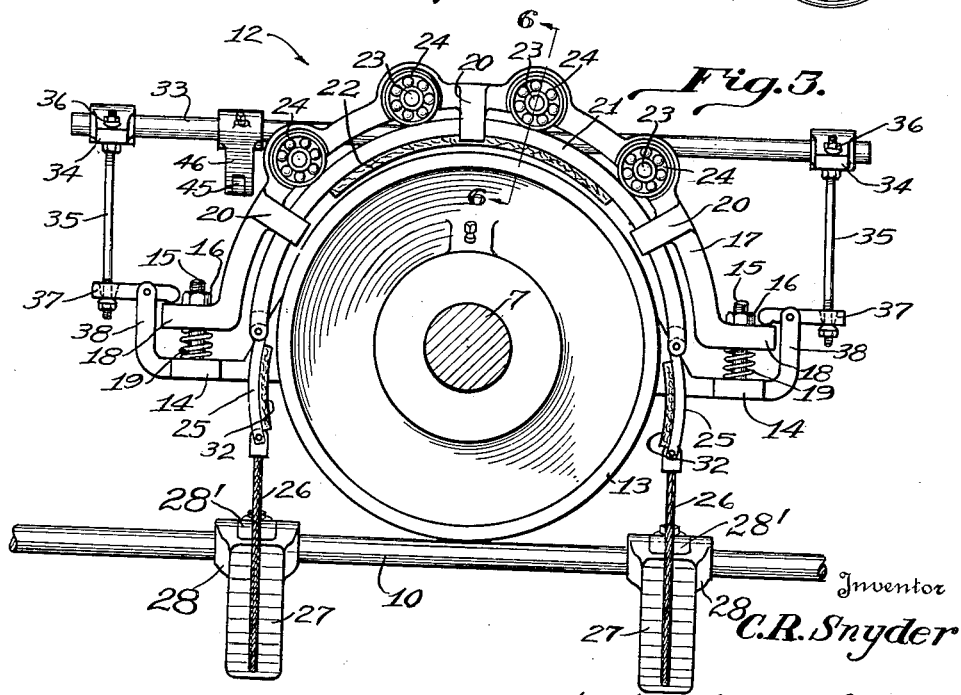
Fig. 3 is a transverse sectional view on an enlarged scale taken on the plane indicated by the line 3—3 of Fig. 1.

The frame 17, as shown particularly in Figs. 3 and 6, has its outer edges provided with inturned fingers 20 which operate to effect the support of an arcuate yoke 21 between the frame 17 and the peripheral portion of the wheel 13. The inner surface of the yoke 21 is provided with spaced layers 22 of fabric brake lining material, and these layers, while rigidly attached to the inner surface of the yoke 21, immediately adjacent to the wheel 13, are normally spaced from said wheel by the action of the springs 19. It will be noticed that the fingers 20 serve to effect the support of the yoke and yet permit of turning movement on the part of said yoke relative to the frame, as will be more fully explained hereinafter.

The frame 17 is provided with a plurality of transversely extending axles 23, which carry at their outer ends ball bearing rollers 24, which rollers are disposed to constantly engage with the outer surfaces of the arcuate yoke 21, whereby when the yoke moves relatively to the frame 17, such relative movement will be accomplished with but a minimum of friction.

Pivotally depending from the yoke 21 is a pair of links 25 of slightly convex form to conform to the peripheral flange of the wheel 13, and the lower ends of the links 25 are pivotally connected by means of cables or their equivalents 26 with arcuate flanges 27 provided upon the outer ends of a pair of crank arms 28, which are loosely mounted upon the shaft 10 and connected for rocking movement in unison therewith by means of dogs 28' fixed to the shaft 10 and engaging shouldered offsets 29 formed with the crank arms 28. The rock shaft 10 may also be provided with a crank lug 29' which may be connected by means of a link 30 with the usual foot actuated brake pedal 31 of a motor vehicle. The pivoted links 25 are also provided with one or more layers of brake lining material as indicated at 32.

In order to bring the yoke 21 into frictional contact with the rim of the wheel 13 to cause movement of said yoke in conformity with the direction of rotation of the wheel, there is journaled in connection with the transmission 6 a rock shaft 33. This rock shaft is provided with crank arms 34, to the outer ends of which are connected the upper ends of tie rods 35. These rods have their ends threaded for the reception of nuts 36 having convex surfaces, which provide for a slight degree of lost motion between the oscillating crank arms 34 and the desired vertical movement of the tie rods. The lower ends of the tie rods engage with pivoted detents 37, carried by upstanding projections 38 which are formed with the outer ends of the brackets 14. The inner ends of the detents 37 engage with the lateral outturned portions of the frame 17, whereby upon the oscillation of the rock shaft 33 to move the crank arms 34 in an upward direction, upward movement is imparted to the tie rods to rock the detents 37. This rocking of the detents results in the application of downwardly applied pressures to the frame 17 against the resistance of the springs 19, thereby bringing the lined surfaces of the yoke 21 into frictional contact with the periphery of the wheel 13. It will be noted that the driving member or wheel 13 is directly connected with the propeller shaft of the vehicle which in turn is connected with the differential and rear axles of the vehicle. Therefore whenever the vehicle is moving, at any speed whatever, the wheel 13 rotates, and by forcing the yoke into frictional engagement with its periphery, corresponding rotary effort is applied to the yoke to move the latter relative to the frame 17. Due to the relative arrangement between the crank arms 28 and the dogs 28' of the shaft 10 either of the arms 28 may be raised so as to rock the shaft. However, when one of the arms is raised due to the application of the brake, the other arm will be free to gravitate and take up the slack developed in the cables 26 as the dog 28' will move away from the shouldered offset 29 of the inactive arm.

This rotary movement in either direction of the yoke is utilized to impart an upwardly directed pull to the cables 26 which rotates or rocks the crank arms 28 and the rock shaft 10, and since this rock shaft is directly connected with the brake devices on the traction wheels of the vehicle, such brake devices will be simultaneously actuated to arrest movement of the vehicle or decelerate its speed. It should be noted that it is merely necessary to apply sufficient force to bring the yoke into contact with the operating wheel 13 to apply the brake and this can be done with but the slightest manual effort on the part of the vehicle operator.

A convenient mechanism for attaining this result is secured by utilizing the accelerator pedal 39 of the motor vehicle. As shown in Fig. 4, the pedal 39 is pivotally mounted as at 40 in connection with the upper end of a lever 41 which, in turn, is pivotally mounted as at 42 in connection with the floor board 43 of the vehicle, and the lower end of the lever 41 is pivotally connected to the forward end of the link 44. The rear end of the link 44 is pivotally connected as at 45 with the outer end of a crank arm 46 mounted on the rock shaft 33. It will be seen that by moving the pedal 39 forwardly, rocking movement will be imparted to the lever 41 and to the link 44 to elevate the crank arms 34 on the rock shaft 33 to bring the yoke 21 into contact with the wheel 13. The outer end of the pedal 39 may engage with a spring pressed stem 47 which extends to the throttle control (not shown) of the motor vehicle. Thus to operate the accelerator, the pedal 39 is rocked about its pivot 40 to depress the stem 47 without rocking the lever 41. Moreover, when it is desired to operate the brakes, the pedal is pushed forwardly, which swings the lever 41 about its pivotal point 42 and effects the application of the brakes. To prevent depression of the accelerator control when the pedal 31 is moved forwardly, use is made of a stationary stop member 48 which is so positioned that it will engage with the forward end of the pedal 39 when the latter is advanced to apply the brake, thus preventing the pedal from engaging the upper end of the stem 47 and operating the associated throttle.

In the modified form of accelerator control disclosed in Fig. 8, the under surface of the pedal 49 is provided with a roller 50 which is adapted for engagement upon forward movement of the pedal with the angularly and upwardly inclined surface formed upon a block 51 stationarily carried in connection with the floorboard. The engagement between the roller 50 and the inclined surface of the block 51 will raise the forward end of the pedal from out of engagement with the accelerator stem 47. Normally, however, the roller 50 is so positioned as to be free to swing with the pedal when the stem 47 is depressed for accelerating purposes.

In view of the foregoing, it will be seen that the present invention provides a simple yet effective means for controlling the application or operation of the brake mechanism of a motor vehicle. The brakes are applied primarily by the movement of the vehicle itself, since whenever the vehicle is in motion, the driving member 13 will also be in a state of rotation, therefore no matter how slightly or slowly the wheel 13 rotates, its very motion is sufficient to set the brakes when its periphery is engaged by the yoke 21. Due to the fact that I use the movement of the vehicle itself in effecting the application of the brakes, the manual control for governing the movement of the yoke 21 may be easily operated. By combining in one control the accelerator and brake actuating means, the motor vehicle is at all times, while moving, under the convenient control of the operator in so far as acceleration and deceleration of vehicular speeds are concerned. Due to the fact that the driven member or yoke 21 turns by frictional contact with the wheel 13, the brake applying means are safe to operate quickly at all speeds, especially when moving in high speeds. There is no tendency on the part of a vehicle so equipped to become unmanageable when the brakes are applied with the vehicle moving ahead at high speeds. The brake applying means may be used either solely or in conjunction with the customary motor vehicle foot brake to control the stopping of the vehicle.

What is claimed is:

1. In a motor vehicle, a member rotatable by the movement of the vehicle, a supporting frame mounted adjacent to said member and spaced from the latter, means admitting of limited movement of said frame toward and away from said member, a brake shoe supported by said frame and movable relative thereto, said frame and shoe being normally spaced from said member, manually operated means for moving said frame to bring said shoe into frictional contact with said member whereby to impart limited turning movement of such shoe in unison with said member, and means connected with the ends of said shoe and responsive to the movement thereof to impart actuating movement to the wheel braking system of the motor vehicle.

2. A mechanism for applying motor vehicle brakes, comprising a driving member mounted on a motor vehicle and rotatable whenever said vehicle is in motion, a driven member normally spaced from the driving member, a supporting frame for said driven member formed to permit of relative movement therebetween, manually operated means for moving said supporting frame to bring the driven member into frictional engagement with said driving member for limited turning movement in unison therewith, and means connected with said driven member and responsive to the movement imparted thereto by frictional contact with said driving member to control the application of the wheel braking system of the associated motor vehicle.

3. In a motor vehicle, a shaft rotatable upon movement of said vehicle, a wheel fixed to rotate with said shaft, a frame movably supported by said vehicle in spaced relation from said wheel, a driven member movably supported by said frame and located between said wheel and said frame, manually controlled means for actuating said frame to frictionally engage said driven member with said wheel, whereby to impart limited turning movement to said member in unison with said wheel, and means connected with said driven member for controlling the operation of the wheel brakes of said vehicle.

4. A motor vehicle, a chassis provided with traction wheels having a braking system associated therewith, a shaft rotatable in unison with said wheels, a drum mounted on said shaft to rotate therewith, a brake shoe around said drum and normally spaced therefrom, a supporting frame for said brake shoe movable toward and away from said drum, manually operated means for controlling the movement of said frame to effect frictional engagement between said brake shoe and said drum whereby to impart limited turning movement to said brake shoe in unison with said drum, spring means associated with said frame and normally serving to maintain said shoe removed from contact with said drum, and means connected with said shoe and operable upon turning movement of said shoe from a normal position and in unison with said drum to effect the application of the wheel brakes of said vehicle.

5. Brake operating mechanism comprising a drum mounted on a motor vehicle for rotary movement whenever said vehicle is in motion, an arcuate brake shoe normally spaced from the periphery of said drum, a supporting frame for said brake shoe, said frame and shoe being mounted for relative movement, manually operated appliances for operating said frame to bring said brake shoe into frictional contact with the periphery of said drum whereby to effect limited turning movement of said brake shoe in unison with the drum, and operating connections associated with both ends of said shoe for controlling the operation of the wheel brakes of the motor vehicle upon turning movement of said shoe from a normal position.

6. Brake operating mechanism for motor vehicles, comprising a drum mounted for rotation in connection with a motor vehicle upon movement of said vehicle, an arcuate band normally spaced from the peripheral portion of said drum, a spring pressed support for said band mounted on said vehicle for movement toward and away from said drum and for movement relative to the supported band, manually operated means cooperative with said support for moving the latter against spring resistance to frictionally contact said band with said drum whereby to impart partial turning movement to said band when said drum is rotating, flexible operating connections carried by the opposite ends of said band, and a vehicle braking system including a rock shaft united with said connections and movable to brake applying positions upon movement of said band when the latter is turned in either direction by coaction with said drum.

7. A motor vehicle, a primary wheel braking mechanism including a simple control member, means for operating said control member comprising a drum carried by said vehicle for rotation upon movement of the vehicle, an arcuate band normally spaced from the peripheral portion of said drum, the inner surface of said band being provided with a woven lining, an arcuate supporting frame for said band, spring means cooperating with said supporting frame and normally serving to maintain the latter and said band removed from coaction with said drum, means on said supporting frame for permitting relative rotation between the frame and band, manually operated means for moving said frame against the resistance of said spring means to contact the lined surface of said band frictionally with the peripheral portion of said drum, whereby upon the rotation of the latter, turning movement will be imparted to said band, and connecting means uniting the ends of said band with the control member of the primary braking system, whereby upon the movement of said band in either direction in response to the rotation of said drum, said control member will be actuated to operate the primary braking system.

8. Brake operating mechanism for motor vehicles comprising: a drum fixed to the drive shaft of a motor vehicle to rotate in unison therewith, an arcuate band, a supporting frame for said band, a mounting for said supporting frame including spring pressed means normally serving to maintain said band removed from contact with the peripheral portion of said drum, anti-friction devices carried by said supporting frame and engageable with said band, manually operated means for moving said supporting frame against the resistance of said spring means to frictionally contact said band with the peripheral portion of said drum, whereby upon the rotation of the drum in either direction turning movement to a limited degree will be imparted to said band, a central brake operating control, and connecting means uniting the ends of said band with said control.

9. Brake operating mechanism for motor vehicles comprising: a drum fixed for rotation in connection with the drive shaft of a motor vehicle, an arcuate band normally spaced from said drum, a supporting frame for said band, spring means cooperative with said supporting frame and serving to maintain said frame and band spaced from said drum, manually operated means cooperative with said frame to press said band against the resistance of said spring means, into frictional contact with said drum, whereby to impart turning movement to said band upon the rotation of said drum in either direction, pivotally connected extensions carried by the ends of said band for cooperation with said drum when said band is turned by the drum from a normal position, a central brake operating control rotatably carried by the vehicle, and flexible connections uniting said extensions with said control.

In testimony whereof I affix my signature.

CHARLES R. SNYDER.